Patented Oct. 6, 1953

2,654,704

UNITED STATES PATENT OFFICE 2,654,704

ELECTROPLATING OF NICKEL

Henry Brown, and LeRoy B. High, Detroit, Mich., assignors to The Udylite Corporation, Detroit, Mich., a corporation of Delaware No Drawing. Application September 16, 1950, Serial No. 185,316

10 Claims. (Cl. 204—49)

Our invention relates to improvements in the electrodeposition of nickel from aqueous acidic baths. It is particularly concerned with the utilization of mixtures of certain types of agents for the purpose of decreasing grain size and increasing the luster of the nickel plate or deposit, and it is especially concerned with the production of electrodeposits of brilliant, highly lustrous, ductile nickel plates.

We have discovered that the above highly desired results are achieved through the conjoint utilization, in the nickel plating bath, of one or more agents of the type exemplified in the following Table I (added as such or formed in situ in the bath), in conjunction with one or more agents of the type exemplified in the following Table II.

The agents of Table I are illustrative of the class of compounds, found to be useful in the practice of our present invention, in accordance with the formula

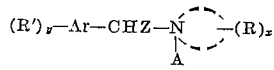

where

represents a compound of the quinoline series selected from the group consisting of quinoline, isoquinoline and C-methyl and ethyl homologues thereof; A is an anion of a water-soluble acid; R is halogen, such as chlorine, bromine and iodine, but particularly chlorine and bromine; R' is a member selected from the group consisting of halogen, nitro, methyl and fluoromethyl groups; Ar is a benzene or naphthalene radical; Z is hydrogen, methyl or ethyl, particularly hydrogen, and $x$ and $y$ are each zero to 2.

The anion represented by A can be any one of a number such as, for example, chlorine, bromine, iodine, sulfate, methosulfate, acetate, citrate, and tartrate. Particularly desirable are the compounds where A is bromine or chlorine.

As indicated, R is halogen, R' can be halogen, nitro, methyl or fluoromethyl groups, and, as $x$ and $y$ can be zero, 1 or 2, the compounds can, for example, contain one or two nuclear halogen atoms in each of the heterocyclic nucleus and the benzene or naphthalene nucleus, or, where $x$ and $y$ are each zero, the aforesaid nuclei are unsubstituted. Excellent results are obtained with compounds where $x$ and $y$ are zero; or where R is chlorine or bromine, R' is chlorine, bromine or nitro, and $x$ is zero and $y$ is 1 or where $x$ is 1 and $y$ is zero, or where both $x$ and $y$ are 1, and especially where Ar is a benzene radical.

Various of the types of quinolinium compounds, and isoquinolinium compounds utilized pursuant to our present invention can, individually, be represented by the following formulae:

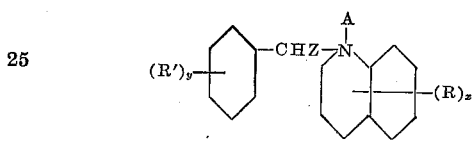

Quinolinium Compounds

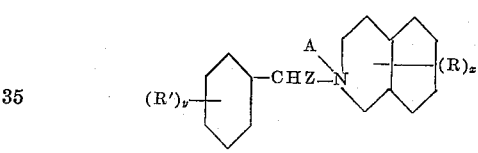

Isoquinolinium Compounds

In the said compounds, the letters A, R, R', Z and $x$ and $y$ have the foregoing significance. In all instances, the bonds leading from the radicals R and R' indicate that said radicals can be substituted at any of the positions of the ring of the quinoline or isoquinoline radical.

Of particular utility are N-benzyl-2-methyl quinolinium chloride; N-benzyl-3-methyl isoquinolinium chloride; N-benzyl-1-methyl isoquinolinium chloride; the corresponding naphthyl compounds; and the mono-nitro derivatives, that is, where the nitro group is in the benzene nucleus of the benzyl radical, for example, N-4-nitrobenzyl quinolinium chloride or bromide.

TABLE I

| No. | Compound | Optimum Conc., Grams/Liter |
|---|---|---|
| 1 | N-benzyl quinolinium chloride | .01–.04 |
| 2 | N-benzyl isoquinolinium chloride | .01–.04 |
| 3 | N-benzyl quinolinium sulfate | .01–.04 |
| 4 | N-benzyl-2-methyl quinolinium chloride | .005–.04 |
| 5 | N-benzyl-2,6-dimethyl quinolinium bromide | .005–.04 |
| 6 | N-benzyl-2-chloro quinolinium chloride | .01–.04 |
| 7 | N-benzyl-2-bromo quinolinium bromide | .01–.04 |
| 8 | N-benzyl-6-chloro quinolinium bromide | .01–.04 |
| 9 | N-benzyl-2,4-dimethyl quinolinium chloride | .005–.04 |
| 10 | N-benzyl-2,4-dichloro quinolinium chloride | .01–.04 |
| 11 | N-benzyl-2,8-dimethyl quinolinium chloride | .01–.04 |
| 12 | N-benzyl-5,8-dimethyl quinolinium chloride | .01–.04 |
| 13 | N-benzyl-1,3-dimethyl isoquinolinium chloride | .005–.04 |
| 14 | N-benzyl-8-methyl quinolinium chloride | .01–.04 |
| 15 | N-benzyl-3-chloro-2-methyl quinolinium chloride | .01–.04 |
| 16 | N-benzyl-3-bromo-2-methyl quinolinium bromide | .01–.04 |
| 17 | N-benzyl-3-methyl isoquinolinium chloride | .005–.04 |
| 18 | N-4-nitrobenzyl quinolinium bromide | .003–.03 |
| 19 | N-2,4-dinitrobenzyl isoquinolinium bromide | .003–.03 |
| 20 | N-4-chlorobenzyl quinolinium chloride | .002–.02 |
| 21 | N-α-methyl naphthalene quinolinium chloride | .003–.02 |
| 22 | N-α-methyl naphthalene isoquinolinium chloride | .003–.02 |
| 23 | m-trifluoromethyl benzyl quinolinium bromide | .003–.02 |
| 24 | m-trifluormethyl benzyl isoquinolinium chloride | .003–.02 |

The agents of Table II are illustrative of the class of compounds which are employed in conjunction with the agents of Table I, in the practice of our invention. The agents of Table II, it will be noted, fall into the category of organic sulfonamides, sulfonimides and sulfonic acids. They have heretofore been used as brighteners in nickel plating baths as is disclosed in part, for example, in my prior Patents Nos. 2,191,813 and 2,466,677. In the practice of our present invention, a coaction takes place in the cathode film, the exact nature of which is unknown, involving the compounds of the type shown in Table I and the organic sulfur-containing brightener which produces the unusual and highly important results which are brought about in accordance with our invention. In this connection, it may be noted that the utilization alone of the agents or compounds of the type shown in Table I, or the utilization alone of the organic sulfur-containing brighteners gives no indication of the remarkably enhanced results which occur when both types of compounds are present in the bath, particularly when utilized in their optimum concentrations. In general, it is desirable to use mixtures of two or more of said sulfur-containing brighteners as, for example, o-benzoyl sulfimide and p-toluene sulfonamide; and allyl sulfonic acid and benzene sulfonamide.

TABLE II

| Sulfur-Containing Brighteners | Optimum Conc., Grams/Liter |
|---|---|
| 1. Benzene sulfonamide | 0.1–3 |
| 2. Toluene sulfonamides (o- and p-) | 0.1–2 |
| 3. o-Benzoyl sulfimide | 0.1–2 |
| 4. N-Benzoyl benzene sulfonimide | 0.1–1 |
| 5. p-Toluene sulfonchloramide | 0.1–1 |
| 6. p-Brom benzene sulfonamide | 0.1–1 |
| 7. 6-Chlor o-benzoyl sulfimide | 0.1–1 |
| 8. m-Aldehydo benzene sulfonamide | 0.1–6 |
| 9. Sulfomethyl benzene sulfonamide | 0.1–3 |
| 10. Benzene sulfonamide m-carboxylic amide | 0.1–3 |
| 11. 7-Aldehydo o-benzoyl sulfimide | 0.1–2 |
| 12. N-Acetyl benzene sulfonimide | 0.1–1 |
| 13. Methoxy benzene sulfonamides | 0.1–2 |
| 14. Hydroxymethyl benzene sulfonamide | 4–12 |
| 15. Vinyl sulfonamide | 4–12 |
| 16. Allyl sulfonamide | 4–12 |
| 17. Benzene sulfonic acids (mono-, di-, and tri-) | 1–15 |
| 18. p-Brom benzene sulfonic acid | 3–6 |
| 19. Benzaldehyde sulfonic acids (o, m, p) | 2–6 |
| 20. Diphenyl sulfone sulfonic acid | 1–8 |
| 21. Naphthalene sulfonic acids (mono-, di-, and tri-) | 1–8 |
| 22. Benzene sulfohydroxamic acid | 1–5 |
| 23. p-Chlor benzene sulfonic acid | 1–15 |
| 24. Diphenyl sulfonic acid | 1–5 |
| 25. m-Diphenyl benzene sulfonic acid | 1–4 |
| 26. 2-Chloro-5-sulfobenzaldehyde | 1–5 |
| 27. m-Benzene disulfonamide | 0.5–1 |
| 28. Allyl sulfonic acid | 4–12 |

It will be understood that said sulfonic brighteners may be utilized in their acid form or in the form of salts as, for example, nickel, sodium, potassium or other salts. Especially satisfactory, for use in the practice of our present invention, are the compounds of Table II corresponding to numbers 1, 2, 3; 18, 19, 21 and 28, the latter particularly in the form of their nickel salts. Where the term sulfonic acids is used herein and in the claims, it will be understood that the salts thereof are likewise included.

The compounds of Table II, used alone, produce reasonably bright deposits on buffed metals such as buffed brass. However, at least in the ordinary case, they do not accomplish the same results on steel polished with 180 emery or on matte (but unburnt) copper plate of 0.0003″–0.0005″ thickness but, rather, generally yield plates of somewhat dull and gray appearance in these cases. The compounds of Table I, in the usual case, when used alone, give a different type of plate than that produced by the compounds of Table II. The plates produced with the compounds of Table I alone are fine grained and cloudy at very low concentrations, and are rather dark, brittle, easily stained and have poor adherence characteristics at higher concentrations. If, however, the two different types of compounds represented in Tables I and II are used together in the baths, as we have indicated above, brilliant mirror-like, adherent and ductile deposits are obtained even over matte surfaces.

Only small proportions of the compounds, or mixtures thereof, of Table I are necessary to achieve the aforesaid results. Generally, proportions in the range of about 0.003 gram/liter to about 0.04 grams/liter of any of the compounds or mixtures thereof will be most effective in the usual case. Even in the case of the less effective ones of the compounds, it is rarely necessary to exceed about 0.06 to 0.08 grams/liter. As a general rule, the optimum concentration of the compounds will be found to fall within the range of about 0.003 to about 0.04 grams/liter.

The compounds of Table II are likewise used in small proportions, in conjunction with the compounds of Table I, amounts of the order of about 0.1 gram/liter to 2 or 3 grams/liter being effective in the usual case. Higher proportions, up to saturation, can, however, be utilized. Ordinarily, it is unnecessary to exceed about 0.5%.

The optimum concentration of the compounds of Tables I and II in any specific instance may readily be determined by simple test in the light of the particular nickel bath utilized, its temperature, its pH, etc.

The aqueous nickel plating baths may be of various types but, in all cases, they are acidic in character. The preferred baths are of the so-called acidic "grey" type which are capable of producing thick, adherent, ductile deposits, those of the Watts' type or modifications thereof being particularly desirable. The nickel salts may comprise nickel chloride, nickel sulfate, nickel fluoborate, nickel sulfamate, or other nickel salts or mixtures of any two or more of said nickel salts, preferably in conjunction with buffer materials as, for example, boric acid. We prefer to utilize boric acid in the bath as it is, in general, the best cathode film buffer. Other buffers of acidic character may, however, be employed as, for example, formic acid, citric acid, fluoboric acid, and the like, and such may be used either in place of or in conjunction with boric acid. For optimum results, the concentration of the boric acid or its equivalent should be above 30 grams per liter, especially in baths operated at somewhat elevated temperatures. The baths may also contain various supplemental agents such as anti-pitting agents and the like.

The baths can be operated at temperatures ranging from about room temperature to almost boiling but, in general, the preferred temperature is in the range of about 40 degrees C. to 65 degrees C. In general, the baths can be operated at pH values ranging from about 2 to about 5.5 but, in the ordinary case, the preferred pH values are from 2.5 to 4.8. The cathode current density ranges are quite variable, a range of about 5 to several hundred amperes per square foot being utilizable, the optimum depending upon agitation, temperature, and concentration and type of nickel salts utilized in the bath. A good working range is about 20 to about 80 amperes per square foot. In Table III, we list preferred embodiments of the bath compositions.

It will be understood that, from time to time, it is necessary to replenish the bath to replace losses due to cathodic processes, "drag-out," and to other causes, in order to maintain the concentrations of the added compounds, etc. in operative proportions.

What we claim as new and desire to protect by Letters Patent of the United States is:

1. A bath for the electrodeposition of bright nickel comprising an aqueous acidic solution of a material selected from the group consisting of nickel chloride, nickel sulfate, nickel fluoborate, a mixture of nickel chloride and nickel sulfate, a mixture of nickel fluoborate and nickel chloride, a mixture of nickel fluoborate and nickel sulfate, and a mixture of nickel sulfate, nickel chloride and nickel fluoborate, said bath also containing, in solution, not more than about 1.5% of at least one brightener selected from the group consisting of organic sulfonamides, sulfonimides, and sulfonic acids, and, in addition, about 0.003 to 0.08 gram per liter of a bath-soluble compound in accordance with the formula

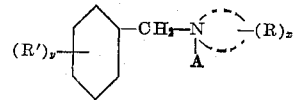

where

represents a compound of the quinoline series selected from the group consisting of quinoline, isoquinoline and C-methyl and ethyl homologues thereof, A is an anion of a water-soluble acid, R is halogen, R′ is a member selected from the group consisting of halogen, nitro, methyl and fluoromethyl groups, and $x$ and $y$ are each zero to 2.

2. A bath in accordance with claim 1, wherein A is a member selected from the group consisting of chlorine and bromine, and $x$ and $y$ are each zero.

3. A bath in accordance with claim 1, wherein R′ is a nitro group, A is a member selected from the group consisting of chlorine and bromine, $x$ is zero and $y$ is 1.

4. A bath for the electrodeposition of bright nickel comprising an aqueous acidic solution of a material selected from the group consisting of nickel chloride, nickel sulfate, nickel fluoborate, a mixture of nickel chloride and nickel sulfate, a mixture of nickel fluoborate and nickel chloride, a mixture of nickel fluoborate and nickel sulfate, and a mixture of nickel sulfate, nickel chloride and nickel fluoborate, said bath also containing, in solution, not more than about 1.5% of at least one brightener selected from the group consisting of organic sulfonamides, sulfonimides, and

TABLE III

| Bath No. | $NiSO_4 \cdot 6H_2O$, Grams/liter | $NiCl_2 \cdot 6H_2O$, Grams/liter | $Ni(BF_4)_2$, Grams/liter | $H_3BO_3$, Grams/liter | Temperature, °F. | pH | Current Density, Amps./sq. ft. | Addition Agents, grams/liter |
|---|---|---|---|---|---|---|---|---|
| 1 | | 300 | | 40 | 75 to 160 | 1 to 5.2 | 10 to 100 | N-benzyl-2-methyl quinolinium chloride—.03. Benzene sulfonamide—2. o-benzoyl sulfimide—2. |
| 2 | | | 100 to 300 | 0 to sat | 75 to 160 | 4 to 5 | 10 to 200 | N-benzyl-3-methyl isoquinolinium chloride—.02. Naphthalene sulfonic acids—3 to 6. |
| 3 | 100 to 200 | 200 to 100 | | 40 | 110 to 140 | 3 to 4.5 | 40 to 60 | N-benzyl-2-chloro pyridinium chloride—.02 to .06. o-benzoyl sulfimide—1. p-toluene sulfonamide—1. |
| 4 | 300 | 60 | | 40 | 70 to 160 | 2.5 to 4.8 | 40 to 60 | N-4-nitrobenzyl pyridinium chloride—.01 to .02. p-toluene sulfonamide—1 to 2. o-benzoyl sulfimide—1 to 3. |
| 5 | 225 | 50 to 75 | | 40 | 70 to 160 | 2.5 to 4.8 | 40 to 60 | N-benzyl-2-methyl quinolinium chloride—.01 to .03. Benzene sulfonamide—2. o-benzoyl sulfimide—2. | sulfonic acids, and, in addition, about 0.003 to 0.04 gram per liter of a bath-soluble compound in accordance with the formula

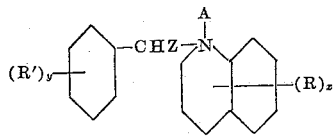

where A is an anion of a water-soluble acid, R is halogen, R' is a member selected from the group consisting of halogen, nitro, methyl and fluoromethyl groups, Z is a member selected from the group consisting of hydrogen, methyl and ethyl, and $x$ and $y$ are each zero to 2.

5. A bath for the electrodeposition of bright nickel comprising an aqueous acidic solution of a material selected from the group consisting of nickel chloride, nickel sulfate, nickel fluoborate, a mixture of nickel chloride and nickel sulfate, a mixture of nickel fluoborate and nickel chloride, a mixture of nickel fluoborate and nickel sulfate, and a mixture of nickel sulfate, nickel chloride and nickel fluoborate, said bath also containing, in solution, not more than about .5% of at least one brightener selected from the group consisting of organic sulfonamides, sulfonimides, and sulfonic acids, and, in addition, about 0.003 to 0.04 gram per liter of a bath-soluble compound in accordance with the formula

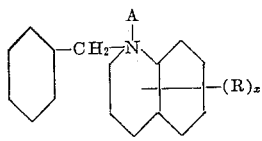

where A is selected from the group consisting of chlorine and bromine, R is methyl and $x$ is zero to 2.

6. A bath for the electrodeposition of bright nickel comprising an aqueous acid solution of a material selected from the group consisting of nickel chloride, nickel sulfate, nickel fluoborate, a mixture of nickel chloride and nickel sulfate, a mixture of nickel fluoborate and nickel chloride, a mixture of nickel fluoborate and nickel sulfate, and a mixture of nickel sulfate, nickel chloride and nickel fluoborate, said bath also containing, in solution, not more than about 0.5% of at least one brightener selected from the group consisting of organic sulfonamides, sulfonimides, and sulfonic acids, and, in addition, about 0.003 to 0.04 gram per liter of a bath-soluble compound in accordance with the formula

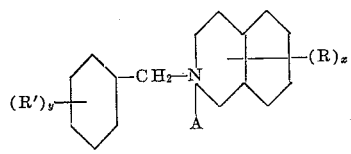

where A is an anion of a water-soluble acid, R is halogen, R' is a member selected from the group consisting of halogen, nitro, methyl and fluoromethyl groups, and $x$ and $y$ are each zero to 2.

7. A method of electrodepositing nickel to obtain a fine-grained, ductile deposit of high brilliance which comprises electrolyzing an aqueous acidic solution of at least one nickel salt, said bath also containing, in solution, not more than about 1.5% of at least one brightener selected from the group consisting of organic sulfonamides, sulfonimides, and sulfonic acids, and, in addition, about .003 to .08 gram/liter of a bath-soluble compound in accordance with the formula

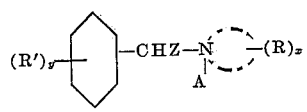

where

represents a compound of the quinoline series selected from the group consisting of quinoline, isoquinoline and C-methyl and ethyl homologues thereof, A is an anion of a water-soluble acid, R is halogen, R' is a member selected from the group consisting of halogen, nitro, methyl and fluoromethyl groups, Z is a member selected from the group consisting of hydrogen, methyl and ethyl, and $x$ and $y$ are each zero to 2.

8. A method of electrodepositing nickel to obtain a fine-grained, ductile deposit of high brilliance which comprises electrolyzing an aqueous acidic solution of a material selected from the group consisting of nickel chloride, nickel sulfate, nickel fluoborate, a mixture of nickel chloride and nickel sulfate, a mixture of nickel fluoroborate and nickel chloride, a mixture of nickel fluoborate and nickel sulfate, and a mixture of nickel sulfate, nickel chloride and nickel fluoborate, said bath also containing, in solution, not more than about 1.5% of at least one brightener selected from the group consisting of organic sulfonamides, sulfonimides, and sulfonic acids, and, in addition, about 0.005 to 0.04 gram per liter of a bath-soluble compound in accordance with the formula

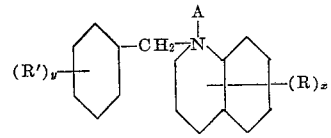

where A is an anion of a water-soluble acid, R is halogen, R' is a member selected from the group consisting of halogen, nitro, methyl and fluoromethyl groups, and $x$ and $y$ are each zero to 2.

9. In a bath for the electrodeposition of bright nickel comprising an aqueous acidic solution of a material selected from the group consisting of nickel chloride, nickel sulfate, nickel fluoborate, a mixture of nickel chloride and nickel sulfate, a mixture of nickel fluoborate and nickel chloride, a mixture of nickel fluoborate and nickel sulfate, and a mixture of nickel sulfate, nickel chloride and nickel fluoborate, an additive for use in an amount of about .003 to .08 gram per liter in combination with at least one brightener selected from the group consisting of organic sulfonamides, sulfonimides and sulfonic acids in an amount of not more than about 1.5% in said bath, said additive consisting of a compound having the formula:

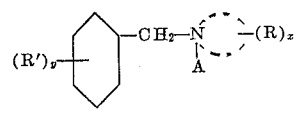

where

represents a compound of the quinoline series selected from the group consisting of quinoline, isoquinoline and C-methyl and ethyl homologues thereof, A is an anion of a water-soluble acid, R is halogen, R' is a member selected from the group consisting of halogen, nitro, methyl and fluoromethyl groups, and $x$ and $y$ are each zero to 2.

10. An additive for an aqueous acidic solution of nickel salts and at least one brightener selected from the group consisting of sulfonamides, sulfonimides and sulfonic acids in an amount of not more than about 1.5% in combination with said additive in an amount of about .003 to .08 gram per liter, said additive consisting of a compound having the formula:

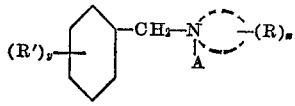

where

represents a compound of the quinoline series selected from the group consisting of quinoline, isoquinoline and C-methyl and ethyl homologues thereof, A is an anion of a water-soluble acid, R is a halogen, R' is a member selected from the group consisting of halogen, nitro, methyl and fluoromethyl groups, and $x$ and $y$ are each zero to 2.

HENRY BROWN.
LEROY B. HIGH.

References Cited in the file of this patent
UNITED STATES PATENTS

| Number | Name | Date |
|---|---|---|
| 2,315,802 | Lind | Apr. 6, 1943 |
| 2,513,280 | Brown | July 4, 1950 |

OTHER REFERENCES

Raub et al., Metal Finishing, August 1940, pp. 429–32.

Industrial and Engineering Chemistry, vol. 33, No. 12 (Dec. 1941), pp. 1546–48.